(12) United States Patent
Pittau

(10) Patent No.: US 7,987,603 B2
(45) Date of Patent: Aug. 2, 2011

(54) SNIPER POLE SHEAR

(75) Inventor: Giovanni Pittau, Maniago (IT)

(73) Assignee: Archman Di Pittau Giovanni & C.S.N.C (IT)

( * ) Notice: Subject to any disclaimer, the term of this patent is extended or adjusted under 35 U.S.C. 154(b) by 0 days.

(21) Appl. No.: 12/732,719

(22) Filed: Mar. 26, 2010

(65) Prior Publication Data

US 2010/0192385 A1 Aug. 5, 2010

Related U.S. Application Data

(63) Continuation of application No. PCT/EP2008/008080, filed on Sep. 24, 2008.

(30) Foreign Application Priority Data

Sep. 26, 2007 (IT) .............................. UD2007A0178

(51) Int. Cl.
 *B26B 13/26* (2006.01)
 *A01G 3/08* (2006.01)
(52) U.S. Cl. ......................................... 30/249; 30/245
(58) Field of Classification Search .................... 30/248, 30/249, 245, 250, 244, 257, 272.1
 See application file for complete search history.

(56) References Cited

U.S. PATENT DOCUMENTS

| | | | |
|---|---|---|---|
| 5,084,975 A | 2/1992 | Melter | |
| 5,933,965 A | 8/1999 | Lindén et al. | |
| 5,960,546 A * | 10/1999 | Cooke et al. | 30/249 |
| 6,038,773 A * | 3/2000 | Le et al. | 30/249 |
| 6,272,755 B1 * | 8/2001 | Mittlesteadt et al. | 30/249 |
| 6,345,445 B1 * | 2/2002 | Schofield | 30/249 |

FOREIGN PATENT DOCUMENTS

CH 293635 A 10/1953
EP 0895712 A1 2/1999

OTHER PUBLICATIONS

International Preliminary Report on Patentability; PCT/EP2008/008080; Aug. 18, 2009; 8 pages.
International Search Report; PCT/EP2008/008080; Jan. 26, 2009; 2 pages.

* cited by examiner

*Primary Examiner* — Stephen Choi
(74) *Attorney, Agent, or Firm* — St. Onge Steward Johnston & Reens LLC

(57) ABSTRACT

A cutting tool of the scissor type includes a pruning head with fixed counter-blade and movable blade operated by a first cord sliding on sheaves. The pruning head is connected to a telescopic extension pole with two side shells that enclose a trolley carrying two trolley sheaves and a fixed sleeve that form a tackle housed within the shells. The telescopic pole is comprised of two pipes, one of which slides inside the other, which are provided with grooves, a sliding cap, a pipe-clamp and a handle, which define a path of a second cord that allows the telescopic lengthening of the pole while maintaining the tension of the cord and maintaining the position of the handle.

3 Claims, 7 Drawing Sheets

SNIPER POLE SHEAR

CROSS-REFERENCE TO RELATED APPLICATIONS

The present application is a continuation of pending International patent application PCT/EP2008/008080 filed on Sep. 24, 2008, which designates the United States and claims priority from Italian patent application number UD2007A000178 filed on Sep. 26, 2007, the content of which is incorporated herein by reference.

FIELD OF THE INVENTION

This invention generally relates to the application field of cutting tools and in particular to loppers for pruning.

BACKGROUND OF THE INVENTION

In the field of the realization of cutting tools the recourse to telescopic systems is well known, particularly with extendible pole provided with a shear at the end and with a traction system at the handle side, generally with cord or other remote driving mechanism that shuts the blade on the corresponding counter-blade to allow the cutting operation on pieces placed at a distance not easily accessible by the operator, for example as in case of the pruning of branches not easily accessible because of the their height from the ground.

The operator acts on the remote operating handle which mechanically controls a transmission system which by means of a chain acts on the blade recalling it towards the counter-blade in order perform the cut.

It is also known the realization of the function of force multiplication applied by means of:

side extension of the blade orthogonally in respect to the cutting surface: said extension constitutes a lever arm intended to multiply in the cutting point the returning action force applied by the operator;

recourse to a couple of eccentric wheels: the operating handle is tangentially connected to one of the two wheels making it to turn around its own centre. Said wheel on its part pulls in rotation the second wheel, eccentric in respect to the first one. Said second wheel pulls the driving chain that, acting on the side extension of the blade, recalls it towards the counter-blade.

Mechanisms of this type are known from EP0895712.

Technical Problems of the Prior Art

The major disadvantages of the above said solutions are:

construction complexity and in particular, for the systems with cord and transmission sheave/s, the easy tangling of the cord tensioning between the sheaves, that generally are provided with multiple channels with more than one multiplication turns (at least two);

moreover in the last case there are also maintenance problems: the presence of a chain requires the lubrication of the same in order to reduce the conking-out risk. Moreover the operations of replacement of the chain require the recourse to tools for its dismounting and for the fixing of the new chain to the movable elements;

reliability;

safety;

limited multiplication of the applied force because of the implementation by means of couples of multichannel pulleys in the first case and eccentric wheels and lever.

SUMMARY OF THE INVENTION

The present invention provides the realization of a new driving mechanism of the cutting tool that allows the obtainment of a greater reliability simplifying at the same time the maintenance of the tool and allowing greater multiplication factors.

The aim is reached with the characteristics of the main claim. The dependent claims represent advantageous solutions.

Advantageous effects of the invention simplified and reduced maintenance;

reduced conking-out risk and greater reliability;

high safety;

greater obtainable multiplication factors of the force applied by the operator.

BRIEF DESCRIPTION OF THE DRAWINGS

With reference to the included drawings an embodiment of the invention is described in the following generally applicable to cutting tools in the particular realization of a pole shears for pruning to be considered as non limiting example of this invention in which.

Figure 2:
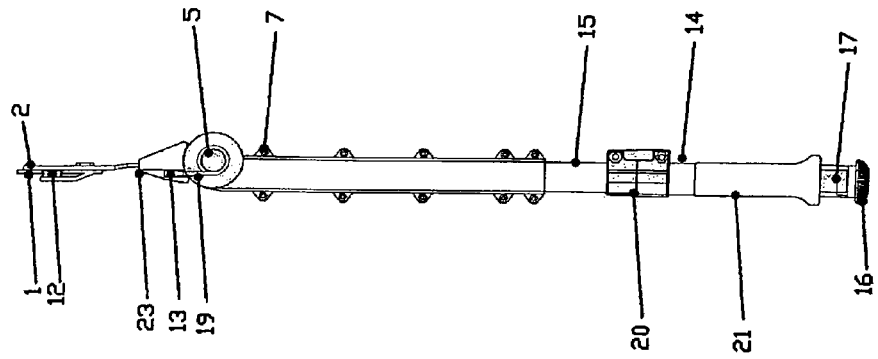

the pruning head (29) composed by the blade (1) with the sheave (12), by the counter-blade (2), by the counter-blade support (3) with guiding sheave (13), by the spring (18);

the closing cap with gear (4);

the internal wheel (5);

the blocking wing-nut (6);

the couple of right (8) and left (7) shells;

the trolley (9);

the movable sheaves (10);

the lower sheave (11);

the external pipe (14) and the internal pipe (15);

the external pipe-ending cap (16);

the internal sliding cap (17);

the first cord or belt (19) fixed in the point (23) on the counter-blade support (3) and in the point (24) on the trolley (9);

the pipe-clamp (20);

the handle (21);

the second cord or belt (22) fixed in the point (26) on the handle (21) and in the point (25) on the pipe-clamp (20).

Figure 1:
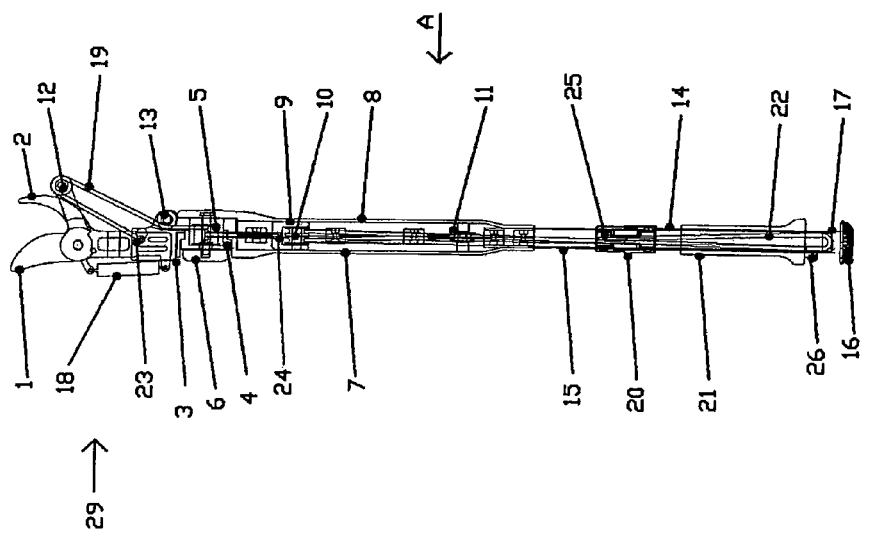
FIG. 1 is a side-view of the cutting tool wherein the following elements are shown.

FIG. 2 is a view according to the point of view indicated with A in FIG. 1, where some of the above described components are identifiable.

Figure 3:
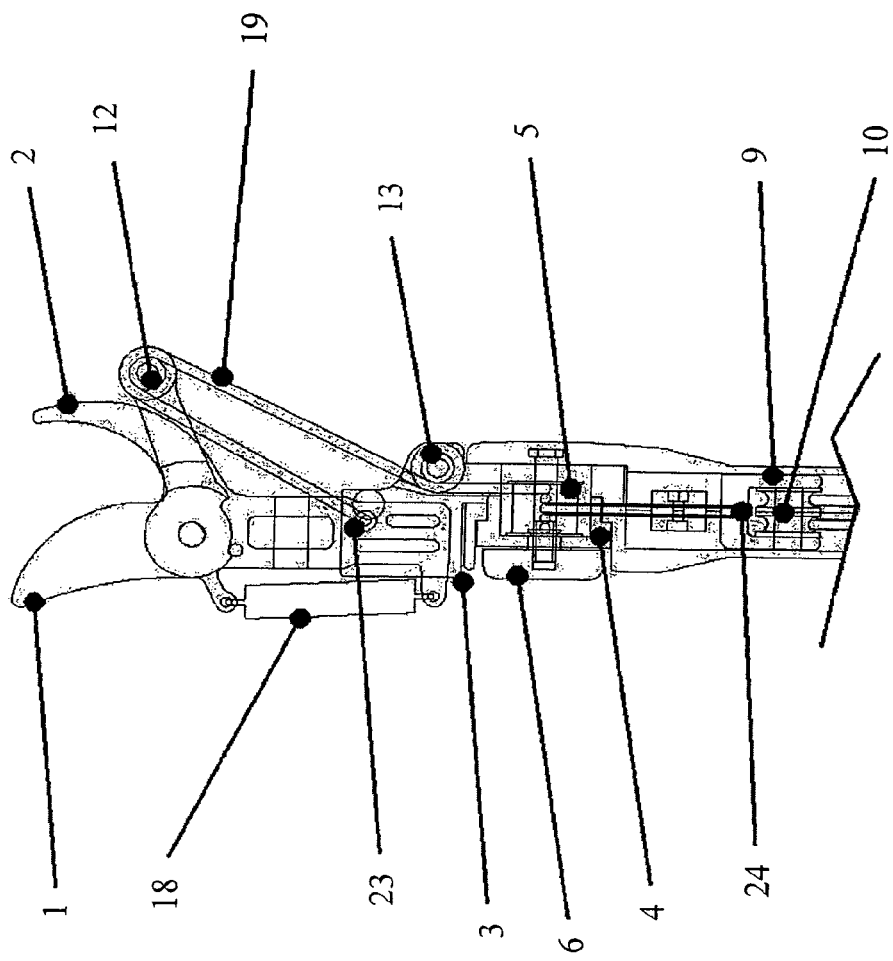

FIG. 3 is a detail of the driving mechanism of the blade of the cutting tool of FIG. 1, where some of the above described components are identifiable.

Figure 4:
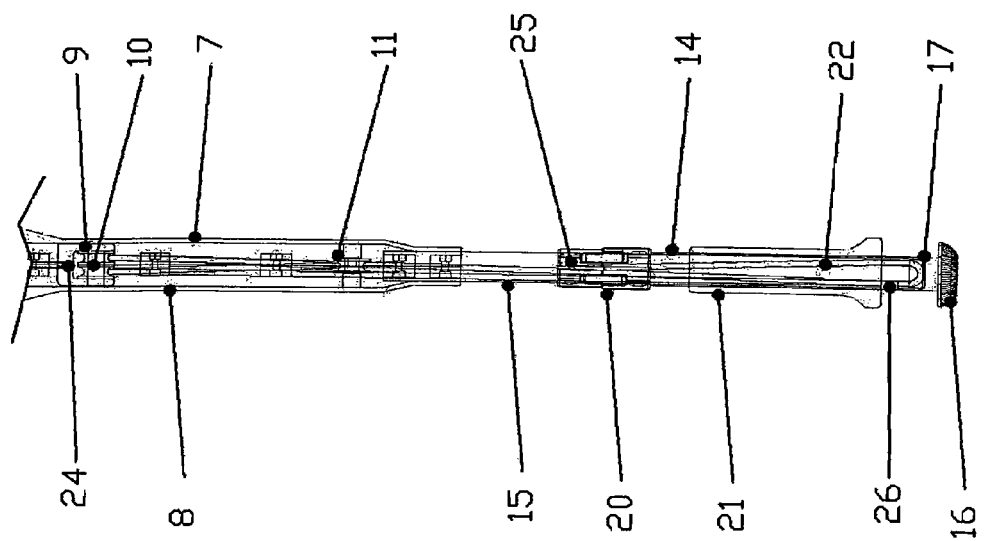

FIG. 4 is a detail of the driving mechanism of the cutting tool of FIG. 1, where some of the above described components are identifiable.

Figure 5:
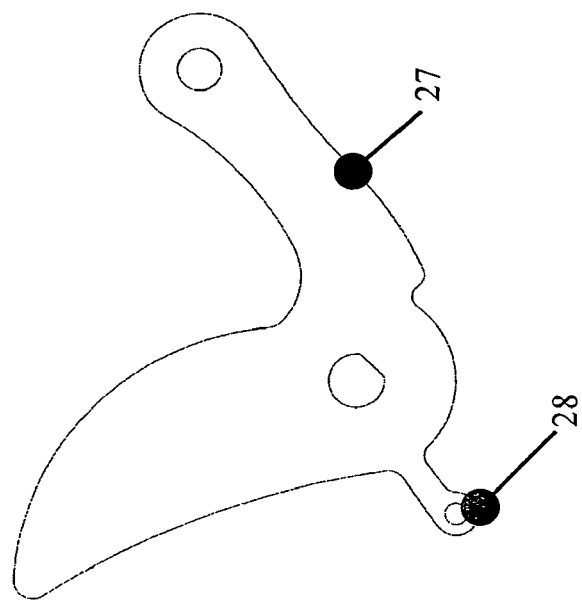

FIG. 5 a view of the blade of the cutting tool of FIG. 1 where it is possible to identify the extension (27) for the fixing of the driving system of said blade and the slot (28) for the fixing of the return spring.

Figure 6:
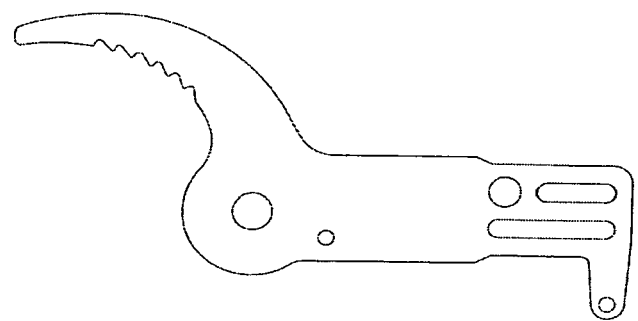

FIG. 6 is a view of the counter-blade of the cutting tool of FIG. 1.

Figure 7:
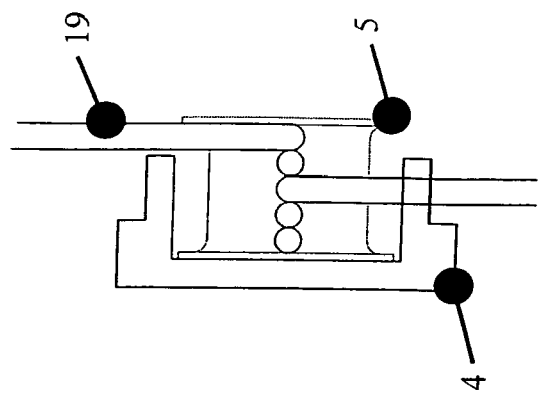

FIG. 7 is a detail of the internal wheel of the cutting tool of FIG. 1, where some of the above described components are identifiable.

Figure 8:
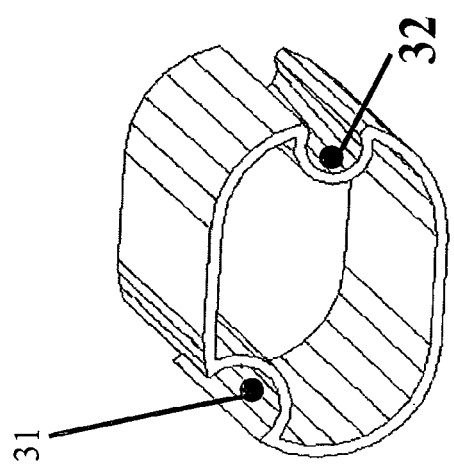

FIG. 8 is a section view of the internal pipe of the cutting tool of FIG. 1.

Figure 9:
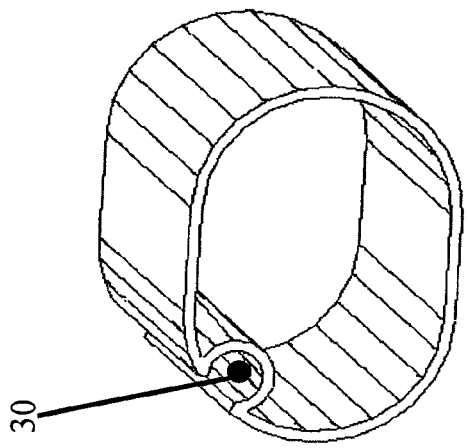

FIG. 9 is a section view of the external pipe of the cutting tool of FIG. 1.

Figure 10:
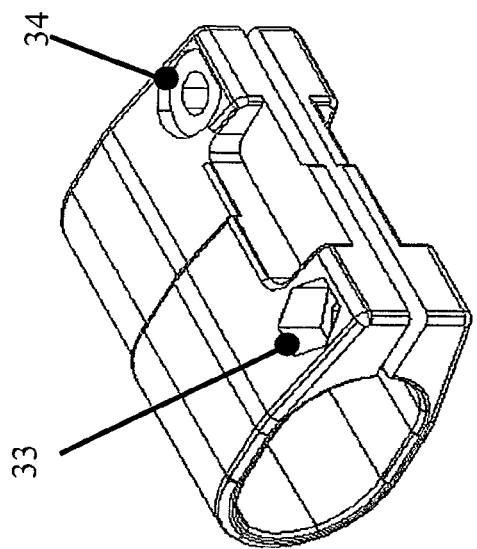

FIG. 10 is a view of the internal pipe-clamp of the cutting tool of FIG. 1.

Figure 11:
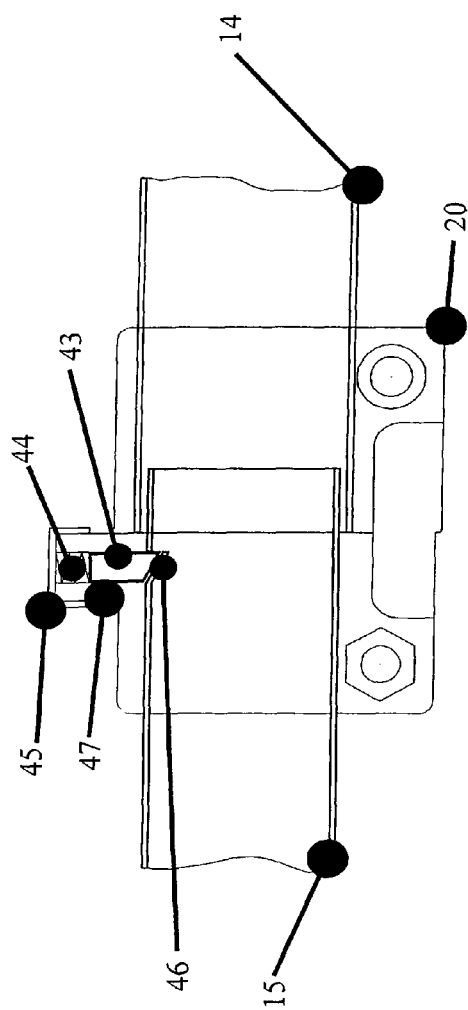

FIG. 11 illustrates the blocking system to avoid the escaping of the internal pipe (15) from the external pipe (14) at the end of the telescopic lengthening. On the pipe-clamp a guide (42) is present able to contain a square pin with conical base (43) and a spring (44) blocked on the upper part by a cap (45). On the groove (32) of the internal pipe (15) a semi-cutting with angled bending (46) is present having an angle corresponding to the one of the square pin with conical base (43) so that during the telescopic lengthening phase, when the aforementioned pin (43) get in correspondence of said semi-cutting (46), under the pushing action of the spring (44), the pin penetrates into said semi-cutting locking the internal pipe (15) and thus avoiding its escaping from the external pipe (14). The semi-cutting angle (46), on the other hand, helps to push the pin (43) towards the spring upon the re-entering of the internal pipe inside the external pipe, thus leaving the sliding free for the reduction of the telescopic lengthening.

Figure 12:
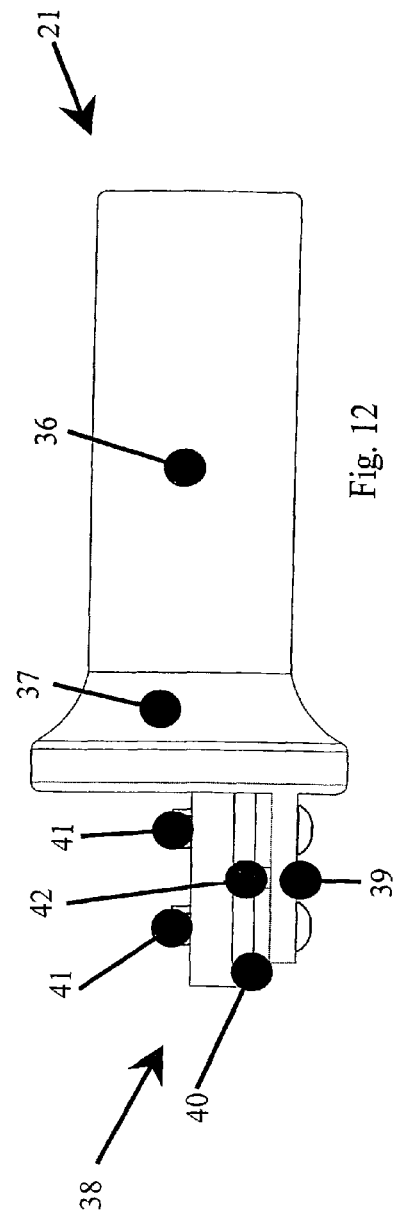

FIG. 12 is a view of the handle (21) made up with a hilt (36) with a swelling (37) for the hand stop, below which a prolongation (38) is present made of two jaws, one of which (39) forming an integral body with the handle (21) and the other one (40) being removable. Such jaws with the pivoting of two screws (41) and a pin (42) allow to lock and unlock the cord or belt (22) to the handle (21) itself for the positioning of the same to the correct distance that is necessary for the operator.

Figure 13:
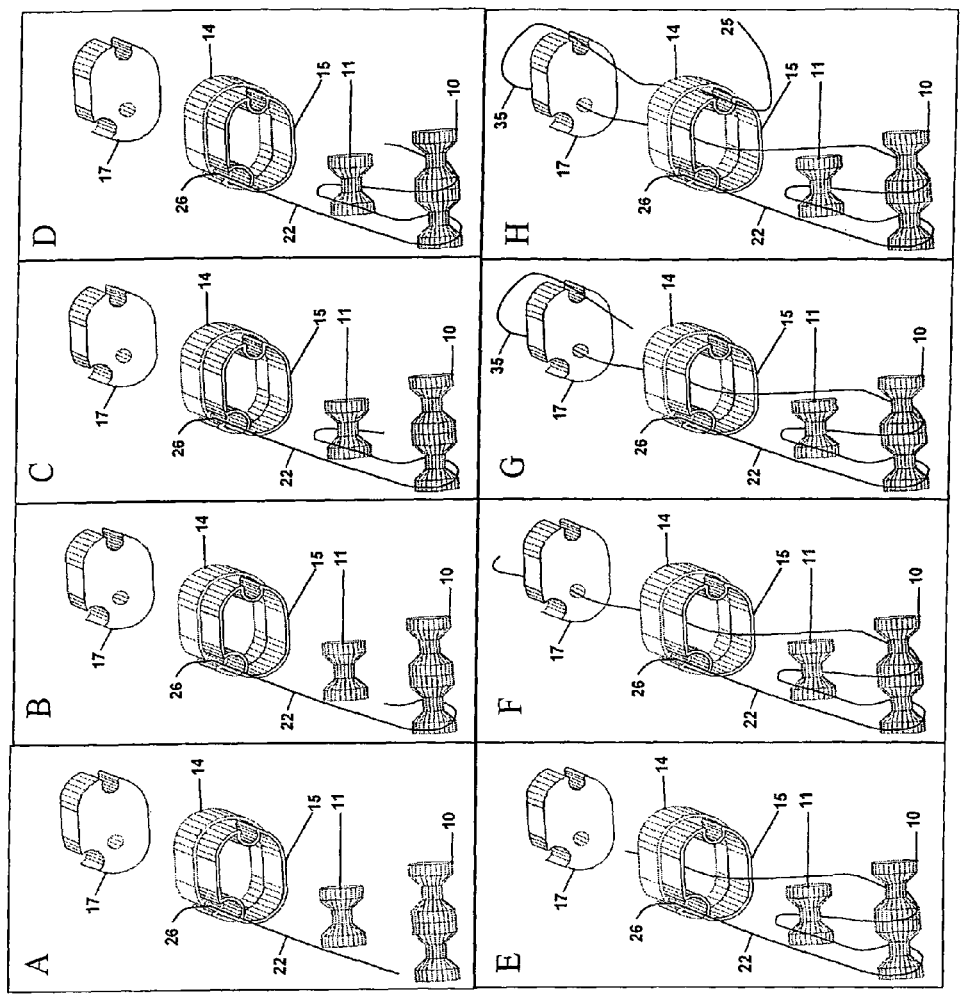

FIG. 13 is a table illustrating the passage of the first cord or belt (19) to drive the mechanism of the cutting tool of FIG. 1.

DETAILED DESCRIPTION OF THE INVENTION

Referring to FIG. 5 the blade (1) is tapered with a convex with an acute angle sharp edge and is equipped with a slot (28) for the hooking of the return spring (18) and with an extension (27) for fixing the operating system that exploits the principle of the lever to realize the multiplication of the applied force during the cutting action.

Referring to FIG. 6 the counter-blade (2) is shaped with a cutting angle less acute in respect to the angle of the blade (1) and such angle is toothed to avoid the sliding of the branch during the cutting phase of the same.

Referring to FIG. 1 the blade (1) is mounted on the counter-blade (2) in such a way as to be able to rotate around the fixing point and close towards said counter-blade in such a way that the cutting action occurs both for the pressure of the blade on the piece to be cut kept in position by the counter-blade and for the sliding of the cutting surface of said blade on said piece to be cut.

The opening of the pruning head (29) occurs by means of the return spring (18) fixed on the counter-blade support (3) on one side and on said blade (1) on the other side by means of a slot (28).

Referring to FIG. 3, the closing of said blade (1) occurs by means of the traction applied by the cord or belt (19). Said cord or belt (19) is fixed on the counter-blade support (3) in the point indicated with (23) by means of a knot, it lays on the sheave of the blade (12), it slides in the guiding sheave (13) which is present on said counter-blade support (3), it performs one or more turns on the internal wheel (5) and it is fixed at the upper end of the trolley (9) in the point indicated with (24).

The operator, acting on the control handle of the cutting tool pulls downwards said trolley (9) that on its part pulls downwards the cord or belt (19) being said cord or belt constrained to said trolley in the point (24). Since the cord or belt performs one or more turns around the internal wheel (5) the traction applied by said trolley (9) turns into a rotation of said internal wheel with consequent release downwards of part of the cord or belt wound around it and with consequent drawing at the opposite end of more cord or belt that winds on said internal wheel reducing the belt or cord length available on the side of the pruning head. The shortening of the cord or belt available on the side of the pruning head turns into a downward pulling of the blade sheave (12) that must move to compensate the reduction of the length of said cord or belt (19).

The drawing of the cord or belt (19) by the wheel (5) is facilitated by the blade sheave (12) and by the guiding sheave (13) which is present on the counter-blade support (3) within which the cord or belt is free to slide frictionless.

Being the blade sheave (12) mounted at the end of an extension (27) of the blade (1), a first multiplication of the applied force is achieved due to the known principle of the lever, for which the extension (27) constitutes an arm.

The pruning head (29) can be oriented by means of the rotation of the counter-blade support (3) body in respect to right (8) and left (7) shells. The wing-nut (6) maintains the cap with gear (4) pressed against the counter-blade support (3) body. The gear which is present on said counter-blade support (3) body engages with the gear which is present on cap plug (4) which on its part engages with the teeth which are present on the right shell (8) preventing the rotation of the pruning head (29) during the use of the cutting tool. Loosening said wing-nut (6), the cap (4) moves away from said counter-blade support (3) body unlocking the gear which is present on it and allowing the rotation of said body for orientating the pruning head in respect to the right (8) and left (7) shells according to the needs of the operator.

Referring to FIG. 2, during the operation of clockwise rotation of the pruning head (29), the internal wheel (5) remains fixed and the exceeding cord or belt (19) winds around it for compensating the lower distance of the blade sheave (12). During the operation of counter-clockwise rotation of said pruning head (29), in a similar way, the cord or belt needed to compensate the greater distance of the blade sheave (12) is recovered by means of the unwinding from said internal wheel (5).

Said right (8) and left (7) shells are integral with the internal pipe (15) which slides on the external pipe (14) exiting from it for realizing the telescopic lengthening function of the cutting tool. Said right (8) and left (7) shells realize as well:

the seat for the sliding of the movable trolley (9) on which the two sheaves (10) are mounted;

the seat for the fixing of the lower sheave (11).

Referring to FIG. 8 that represents a view of the internal pipe (15) and to FIG. 9 that represents a view of the external pipe (14), said pipes are shaped in order to be able to be inserted the one inside the other. The external pipe (14) is provided with a groove (30) that engages on the corresponding groove (31) of the internal pipe (15).

Said groove (30) has three functions:

it constitutes the fitting for the longitudinal engagement with the internal pipe (15);

it constitutes the seat for the sliding of the second cord or belt (22) fixed in the point indicated with 26 on the handle (21). Said handle being the control of the tool on which the operator acts to activate the cutting tool.

The internal pipe (15) is provided with two grooves:

the groove (31) engaging with the corresponding groove (30) of the external pipe (14) to perform said engagement between the two pipes; —the groove (32) whose closed portion encompassed inside the external pipe (14) constitutes an internal duct within which the second cord or belt (22) slides.

Referring to FIG. 10 the pipe-clamp (20) is fixed to the external pipe (14) by means of the screw that is inserted in the seat (33) and is fixed to the internal pipe by means of a wing-nut which is inserted in the seat (34). Said pipe-clamp (20) is shaped in such a way that the grooves which are present on the internal and external pipes are not obstructed allowing the passage of the cord or belt within said grooves passing below said pipe-clamp without meeting any obstacle.

Loosening the wing-nut inserted in the seat (34) the internal pipe is free to slide inside the external pipe coming out of it realizing the telescopic lengthening of the cutting tool. After the lengthening is completed, the position is fixed by means of the wing-nut that is inserted in the seat (34) of said pipe-clamp (20).

Particularly referring to FIG. 12, the handle (21) consists of a hilt (36) with a swelling (37) for the hand stop; below it a prolongation (38) is present made of jaws (39) and (40) one jaw of which is fixed (39), forming an integral body with the handle (21). Such jaws with the pivoting of two screws (41) and a pin (42) allow to lock and unlock the cord or belt (22) to the handle (21) itself for the positioning of the same to the correct distance necessary for the operator.

Referring to FIG. 13:

table A: the second cord or belt (22) is fixed on the handle in the first fixing point (26) by means of a knot or by means of the previously described jaws system and constituting a prolongation of the handle itself, said locking being able to occur in different positions of the handle allowing the adjusting of the position of the handle along the pole according to the needs of the operator;

table B: said cord or belt (22) goes up in the seat formed by the groove (30) of the external pipe (14), passes inside of the pipe-clamp (20) and still goes up in the seat formed by the groove (31) on the internal pipe (15), enters inside the right (8) and left (7) shells and passes around the first of the two sheaves (10) mounted on the movable trolley (9);

table C: said cord or belt (22) goes back down inside the right (8) and left (7) shells to pass around the lower sheave (11);

table D: said cord or belt (22) goes up again inside the right (8) and left (7) shells to pass around the second of two sheaves (10) mounted on the movable trolley (9);

table E: said cord or belt (22) goes down inside the internal pipe (15);

table F: said cord or belt (22) passes in the hole of the internal sliding cap (17) that is mounted at the bottom of the internal pipe (15);

table G: said cord or belt (22) passes in the groove of said internal sliding cap (17) realizing a loop (35);

table H: said cord or belt (22) goes up inside the duct made with the groove (32) of the internal pipe (15) and closed within the external pipe (14) to be fixed in the point indicated with (25) on the pipe-clamp (20).

The above described passing system of the second cord or belt (22) realizes three functions:

making use of a fixed lower sheave (11) and of a couple of sheaves (10) on the trolley (9) movable in respect to said lower sheave (11), realizes a tackle with the function of multiplying the force applied by the operator by means of the traction of the cord or belt through the handle (21) whereon said cord or belt is fixed;

making use of the grooves obtained in the internal (15) and external (14) pipes forms on the cord or belt (22) an oxbow (35) which during the operation of telescopic lengthening of the tool slides on the internal sliding plug (17) and releases the exceeding cord or belt present on the side of the pipe-clamp (fixing point indicated with 25) in order to make it available on the side of the handle (fixing point indicated with 26) so that, during such operation of telescopic lengthening, the cord always remains in a tense condition and the operating handle still remains in the prearranged position chosen by the operator;

making use of the the grooves obtained in the internal (15) and external (14) pipes and of the passage on the internal sliding plug (17) realizes a path of the cord or belt (22) that avoids the presence of sections which are in common to the forward and return paths of the cord or belt with the benefit to prevent the tangling on said cord or belt (22) during the operation of telescopic lengthening and during the operation of telescopic retraction of the tool.

The sliding cap (17) has a section whose external profile (perimeter) is shaped in a way corresponding to the internal profile of the section of the external pipe (14). The pipe-clamp (20) is shaped in such a way as to have an upper part with an internal profile identical to the external profile of the section of the internal pipe (15) and a lower part with an internal profile identical to the external profile of the section of the external pipe (14). Said conformations of the sliding cap (17) and of the pipe-clamp (20), having the function to maintain the internal pipe (15) perfectly in the centre of the external pipe (14) avoiding the rubbing of one with the other.

The previous description relates to a preferred illustrative embodiment of the invention, being applicable as well to other tools of which the lopper constitutes only an exemplary embodiment.

What is claimed is:

1. A cutting tool of the scissor type, comprising:
a pruning head having a fixed counter-blade and a rotating blade that has an integral extension and that rotates around a pin to cooperate with said counter-blade to cut an object between said rotating blade and said counter-blade, a return spring with which said rotating blade is drawn in an open position, plurality of pruning head sheaves, and a first cord or belt sliding on said plurality of sheaves and connected to the extension of said rotating blade;
an extension pole;
two side shells connecting said pruning head to said extension pole;
trolley connected to said first cord, moveably disposed between said side shells, and carrying first and second trolley sheaves;
a fixed sheave disposed between said side shells with which said trolley sheaves form a tackle;
wherein said extension pole comprises an internal pipe and an external pipe;
a second cord or belt slidably disposed in said internal pipe;
wherein said internal pipe has a first groove and a second groove which are longitudinal along the whole length of said internal pipe and shaped such that the second cord or belt is not obstructed when sliding within said inner pipe;
wherein said external pipe has a groove which is longitudinal along the whole length of said external pipe, is shaped such that it slides in said first groove of the internal pipe to permit relative sliding between said internal and external pipes and increase the length of the extension pole, and is shaped such that the cord or belt is not obstructed when sliding;
wherein the groove of said external pipe and the first groove of said inner pipe each define at least partially open external passages, and said second groove of said internal pipe and said external pipe define an internal duct;

a locking system disposed on said extension pole for preventing relative sliding between said external pipe and said internal pipe and shaped in such a way as not to occlude the grooves of said external and internal pipes;

a sliding cap closing a lower end of said internal pipe and shaped in such a way as not to occlude the the smaller groove of said internal pipe;

wherein said sliding cap has a through-hole through which the second cord or belt exits from the lower end of the internal pipe and a groove shaped to facilitate the sliding of the second cord or belt such that said second cord or belt passes in and out of said internal and external pipes without interfering with the relative sliding of said pipes:

an operating handle slidably disposed on said external pipe;

wherein the second cord or belt is connected to the operating handle;

wherein said second cord or belt extends along the groove of the external pipe;

wherein said second cord or belt passes below the locking system and continues along the first groove of the internal pipe;

wherein said second cord or belt continues up through said shells;

wherein said second cord or belt continues around the first trolley sheave;

wherein said second cord or belt continues down through said shells and continues around the fixed lower sheave;

wherein said second cord or belt continues up through said shells and continues around the second trolley sheave;

wherein said second cord or belt continues down inside the internal pipe;

wherein said second cord or belt continues down through the hole of the internal sliding cap closing the lower end of the internal pipe, wherein said second cord or belt continues up through the groove of said internal sliding cap;

wherein said second cord or belt continues through the internal duct and is fixed on the locking system.

2. A cutting tool according to claim 1, further comprising a rotatable inner wheel, wherein said first cord or belt is wound one or more times around the rotatable internal wheel.

3. A cutting tool according to claim 1, wherein said locking system comprises a pipe-clamp having an upper part with an internal profile corresponding to the external profile of a section of the internal pipe and a lower part with an internal profile corresponding to the external profile of a section of the external pipe, and wherein said sliding cap is shaped with a section whose external profile corresponds to the internal profile of the external pipe.

* * * * *